United States Patent
Smith et al.

(10) Patent No.: US 12,529,265 B2
(45) Date of Patent: *Jan. 20, 2026

(54) WIND TURBINE TOWER ATTACHMENT

(71) Applicant: KEYSTONE TOWER SYSTEMS, INC., Denver, CO (US)

(72) Inventors: Eric D. Smith, Denver, CO (US); Loren Daniel Bridgers, Golden, CO (US)

(73) Assignee: KEYSTONE TOWER SYSTEMS, INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,429

(22) Filed: May 15, 2023

(65) Prior Publication Data

US 2023/0392444 A1 Dec. 7, 2023

Related U.S. Application Data

(63) Continuation of application No. 16/822,257, filed on Mar. 18, 2020, now Pat. No. 11,686,155, which is a
(Continued)

(51) Int. Cl.
*E06C 9/02* (2006.01)
*F03D 80/50* (2016.01)
*F03D 80/80* (2016.01)

(52) U.S. Cl.
CPC .............. *E06C 9/02* (2013.01); *F03D 80/50* (2016.05); *F03D 80/88* (2016.05)

(58) Field of Classification Search
CPC ..... E06C 9/02; E06C 9/06; E06C 9/08; E06C 9/085; F03D 80/50; F03D 80/80; F03D 80/88; F03D 80/881; E04G 3/246
(Continued)

(56) References Cited

U.S. PATENT DOCUMENTS

| | | | |
|---|---|---|---|
| 213,544 | A | 3/1879 | Chamberlain |
| 304,821 | A | 9/1884 | Hofele |

(Continued)

FOREIGN PATENT DOCUMENTS

| | | | |
|---|---|---|---|
| CN | 1556898 | A | 12/2004 |
| CN | 1918349 | A | 2/2007 |

(Continued)

OTHER PUBLICATIONS

U.S. Patent and Trademark Office, "International Preliminary Report on Patentability," issued in related International Patent Application No. PCT/US2018/013217, dated Jul. 16, 2019 (5 pages).
(Continued)

*Primary Examiner* — Colleen M Chavchavadze
(74) *Attorney, Agent, or Firm* — The Marbury Law Group, PLLC (57) ABSTRACT

Devices, systems, and methods are directed to mounting an auxiliary component to a tower based at least in part on a force distribution in which a normal force is greater than a shear force exerted by the auxiliary component on a shell of the tower such that the auxiliary component may be held in place relative to the tower without penetrating the shell of the tower. Thus, as compared to mounting techniques requiring penetration of the shell of the tower, this force distribution along the shell of the tower may facilitate mounting the auxiliary component to the tower with little to no impact on cost and/or structural requirements of the tower. Further, or instead, as compared to other mounting techniques, mounting the auxiliary component based at least in part on this force distribution may reduce or eliminate the need for specialized tools, thus facilitating in-field installation of the auxiliary component.

10 Claims, 7 Drawing Sheets

Related U.S. Application Data continuation of application No. 15/867,626, filed on Jan. 10, 2018, now Pat. No. 10,626,672.

(60) Provisional application No. 62/444,458, filed on Jan. 10, 2017.

(58) Field of Classification Search
USPC .......................................................... 248/300
See application file for complete search history.

(56) References Cited

U.S. PATENT DOCUMENTS

| | | | |
|---|---|---|---|
| 311,239 A | | 1/1885 | Evans |
| 557,111 A | * | 3/1896 | Cotter .................. A47B 96/061 248/247 |
| 887,550 A | | 5/1908 | Broekhoven |
| 1,015,173 A | | 1/1912 | Grünbaum |
| 1,156,129 A | * | 10/1915 | Berger .................. A47B 96/061 248/247 |
| 1,193,832 A | | 8/1916 | Seymoure |
| 1,206,049 A | | 11/1916 | Tank |
| 2,622,783 A | | 12/1952 | Mahoney |
| 2,794,583 A | | 6/1957 | Ernst |
| 2,965,195 A | | 12/1960 | Paschen |
| 2,998,863 A | | 9/1961 | Larson |
| 3,012,633 A | | 12/1961 | Magee |
| 3,212,519 A | | 10/1965 | Paschen |
| 3,575,263 A | | 4/1971 | Reinhard |
| 3,601,220 A | | 8/1971 | Sauder |
| 3,618,702 A | | 11/1971 | Hendrix, Jr. |
| 3,768,016 A | | 10/1973 | Townsend et al. |
| 3,915,418 A | | 10/1975 | D'Amato |
| D257,947 S | | 1/1981 | Reynoso |
| 4,275,757 A | * | 6/1981 | Singer ..................... E02D 29/12 52/20 |
| 4,386,487 A | * | 6/1983 | Scott ....................... F03D 80/85 52/182 |
| 4,425,983 A | | 1/1984 | Reinhard |
| 4,476,957 A | | 10/1984 | Ory |
| 4,671,382 A | * | 6/1987 | D'Alessio ............... E04G 1/362 52/638 |
| 4,910,926 A | * | 3/1990 | Paulsson ............. E04D 13/0725 52/13 |
| 6,467,233 B1 | | 10/2002 | Maliszewski et al. |
| 6,907,957 B1 | | 6/2005 | Couch |
| 7,739,843 B2 | | 6/2010 | Cortina-Cordero |
| 8,033,078 B2 | | 10/2011 | Llorente Gonzalez |
| 8,061,999 B2 | | 11/2011 | Bagepalli et al. |
| 8,567,131 B2 | * | 10/2013 | Ollgaard ............... E04H 12/342 52/40 |
| 8,944,211 B2 | | 2/2015 | Blaska |
| 9,085,904 B2 | | 7/2015 | Hopper |
| 9,487,960 B2 | * | 11/2016 | Kent ..................... E04H 12/342 |
| 10,047,725 B2 | | 8/2018 | Yenser et al. |
| 10,260,284 B2 | * | 4/2019 | Lockwood ............. E04H 12/16 |
| 10,626,672 B2 | | 4/2020 | Smith et al. |
| 11,686,155 B2 | * | 6/2023 | Smith ..................... F03D 13/20 182/93 |
| 2002/0012582 A1 | | 1/2002 | Kirkegaard et al. |
| 2003/0147753 A1 | | 8/2003 | Ollgaard |
| 2010/0122508 A1 | | 5/2010 | Kristensen |
| 2010/0186342 A1 | | 7/2010 | Øllgaard |
| 2011/0248506 A1 | | 10/2011 | Ruiz Urien et al. |
| 2011/0252720 A1 | | 10/2011 | Kristensen |
| 2015/0027068 A1 | | 1/2015 | Sayers et al. |
| 2015/0078914 A1 | | 3/2015 | Ebbesen |
| 2015/0354233 A1 | | 12/2015 | Ebbesen |
| 2015/0376906 A1 | * | 12/2015 | Wilson .................... E04G 5/007 182/128 |
| 2016/0215520 A1 | | 7/2016 | Samuelsen |
| 2017/0058604 A1 | * | 3/2017 | Minette .................... E06C 7/48 |
| 2017/0247945 A1 | | 8/2017 | Wang et al. |
| 2018/0195345 A1 | | 7/2018 | Smith et al. |

FOREIGN PATENT DOCUMENTS

| | | |
|---|---|---|
| CN | 102084069 A | 6/2011 |
| CN | 110382803 | 1/2022 |
| DE | 202006017158 U | 12/2007 |
| DE | 102010008639 A1 | 8/2011 |
| EP | 4144950 A1 | 3/2023 |
| EP | 3548680 | 4/2023 |
| WO | 0238953 A3 | 5/2002 |
| WO | 2018132509 A1 | 7/2018 |

OTHER PUBLICATIONS

The U.S. Patent and Trademark Office, "International Search Report and Written Opinion," issued in related International Patent Application No. PCT/US2018/013217, dated Mar. 19, 2018 (6 pages).

European Patent Office, "Office Action," issued in related European Patent Application No. 18739037.2, dated Sep. 17, 2021 (4 pages).

European Patent Office, "Decision to Grant," issued in related European Patent Application No. 18739037.2, dated Mar. 10, 2023 (2 pages).

European Patent Office, "Extended Search Report," issued in related European Patent Application No. 22204945.4, dated Feb. 8, 2023 (7 pages).

European Patent Office, "Intent to Grant," issued in related European Patent Application No. 22204945.4, dated Oct. 27, 2023 (8 pages).

National Intellectual Property Administration, P.R. China, "Search Report," issued in related Chinese Patent Application No. 201880017129.X, dated Jul. 10, 2020 (3 pages).

National Intellectual Property Administration, P.R. China, "First Office Action," issued in related Chinese Patent Application No. 201880017129.X, dated Jul. 16, 2020 (16 pages).

National Intellectual Property Administration, P.R. China, "Second Office Action," issued in related Chinese Patent Application No. 201880017129.X, dated Mar. 3, 2021 (36 pages).

National Intellectual Property Administration, P.R. China, "Notification to Grant Patent," issued in related Chinese Patent Application No. 201880017129.X, dated Nov. 3, 2021 (6 pages).

European Patent Office, "Decision to Grant," issued in related EP Application No. 22204945.4 dated Mar. 21, 2024 (2 pages).

European Patent Office, "Supplemental European Search Report," issued in related European Patent Application No. 18739037.2 dated Jun. 26, 2029 (6 pages).

U.S. Patent and Trademark Office, "Restriction Requirement," issued in related U.S. Appl. No. 15/867,626 dated Jun. 22, 2018 (6 pages).

U.S. Patent and Trademark Office, "Non-Final Office Action," issued in related U.S. Appl. No. 15/867,626 dated Sep. 4, 2018 (17 pages).

U.S. Patent and Trademark Office, "Final Office Action," issued in related U.S. Appl. No. 15/867,626 dated Feb. 26, 2019 (14 pages).

U.S. Patent and Trademark Office, "Non-Final Office Action," issued in related U.S. Appl. No. 15/867,626 dated Aug. 2, 2019 (12 pages).

U.S. Patent and Trademark Office, "Notice of Allowance and Issue Fee(s) Due," issued in related U.S. Appl. No. 15/867,626 dated Dec. 18, 2019 (9 pages).

U.S. Patent and Trademark Office, "Non-Final Office Action," issued in related U.S. Appl. No. 16/822,257 dated Apr. 11, 2022 (26 pages).

U.S. Patent and Trademark Office, "Notice of Allowance and Issue Fee(s) Due," issued in related U.S. Appl. No. 16/822,257 dated Feb. 15, 2023 (8 pages).

* cited by examiner

WIND TURBINE TOWER ATTACHMENT

CROSS-REFERENCE TO RELATED APPLICATIONS

This application is a continuation of U.S. patent application Ser. No. 16/822,257, filed Mar. 18, 2020, which is a continuation of U.S. patent application Ser. No. 15/867,626 (issued as U.S. Pat. No. 10,626,672), filed Jan. 10, 2018, which claims the benefit of U.S. Provisional Patent Application No. 62/444,458, filed Jan. 10, 2017, with the entire contents of each of these applications hereby incorporated herein by reference.

BACKGROUND

Wind turbine towers elevate wind turbines to appropriate height. Wind turbine towers also provide maintenance access to the wind turbines and support auxiliary components useful for the maintenance and operation of the wind turbines. Certain auxiliary components are placed within towers, which may be useful for protecting the auxiliary components and users of the auxiliary components from detrimental effects of weather. Examples of these internally placed components, typically referred to as "internals," include ladders, platforms, cables, cable guides, and hardware that connects these components to the towers. Other auxiliary components, such as lights, antennae, and measurement devices, are externally attached to the towers.

Whether internally or externally attached to a tower, the auxiliary components are typically attached to the tower via fixtures (e.g., brackets, bosses, and studs) welded to the tower. Welding to the tower structure, however, can create an area with a low allowed fatigue stress (low fatigue detail category), which can require the tower to have thicker walls. That is, for the same loading, if the allowed stress in the material is reduced, the material thickness must be increased so that the load forces can act over a larger area. Thus, by requiring thicker material, attaching the auxiliary components to the tower via fixtures welded to the tower adds both weight and cost to the tower. Accordingly, there remains a need for improved techniques for attaching auxiliary components to towers.

SUMMARY

Devices, systems, and methods are directed to mounting an auxiliary component to a tower based at least in part on a force distribution in which a normal force is greater than a shear force exerted by the auxiliary component on a shell of the tower such that the auxiliary component may be held in place relative to the tower without compromising the shell of the tower. Thus, as compared to mounting techniques requiring penetration of the shell of the tower, this force distribution along the shell of the tower may facilitate mounting the auxiliary component to the tower with little to no impact on cost and/or structural requirements of the tower. Further, or instead, as compared to other mounting techniques, mounting the auxiliary component based at least in part on this force distribution may reduce or eliminate the need for specialized tools, thus facilitating in-field installation of the auxiliary component.

According to one aspect, a tower may include a section including a shell having an inner surface defining a volume, and an auxiliary component at least partially disposed in the volume, the auxiliary component may include a first coupling and a second coupling, and the first coupling and the second coupling attaching the auxiliary component to the section. A first force exerted by the auxiliary component on the section via the first coupling may be substantially perpendicular to a normal component of a second force exerted by the auxiliary component on the inner surface of the shell via the second coupling, and, at the second coupling, the auxiliary component may be preferentially flexible in a direction perpendicular to the normal component of the second force.

In certain implementations, the normal component of the second force may be greater than a shear component of the second force exerted by the auxiliary component on the inner surface of the shell.

In some implementations, the first coupling and the second coupling may collectively restrict movement of the auxiliary component in three dimensions relative to the inner surface of the shell.

In certain implementations, the shell may be a tube, the first force exerted by the auxiliary component on the section, via the first coupling, may be directed substantially parallel to the inner surface of the shell. The tube may be, for example, a cylindrical tube. Additionally, or alternatively, the tube may be tapered along a center axis defined by the tube.

In some implementations, the section may further include a flange coupled to the shell. The flange may support the first force exerted by the auxiliary component on the section, and the flange may be attachable to one or more additional components to form the tower. Further, or instead, the first coupling may be attached to the flange of the section.

In certain implementations, the second coupling may be attached to the inner surface of the shell. Additionally, or alternatively, with the second coupling attached to the inner surface of the shell, the inner surface of the shell may be unpenetrated by the second coupling. As an example, the second coupling may include an adhesive in contact with the inner surface of the shell. As a further or alternative example, at least one portion of the inner surface of the shell may be formed of a ferromagnetic material, and the second coupling may include a magnet (e.g., a permanent magnet) in contact with the ferromagnetic material.

In some implementations, at the first coupling, the auxiliary component may be preferentially flexible in a direction perpendicular to the first force exerted by the auxiliary component on the section via the first coupling.

In certain implementations, the auxiliary component may further include a body and a linkage arm. The linkage arm may have a first end portion and a second end portion opposite the first end portion. The first end portion of the linkage arm may be, for example, mechanically coupled to the body. Additionally, or alternatively, the second end portion of the linkage arm may be mechanically coupled to the second coupling. In certain implementations, the first end portion may include a first revolute joint and the second end portion may include a second revolute joint. Further, or instead, the first coupling may include a third revolute joint, and the first revolute joint, the second revolute joint, and the third revolute joint may be oriented relative to each other such that a respective axis of rotation of each respective revolute joint is parallel to a respective axis of rotation of each of the other revolute joints. Still further or instead, the first coupling and the second coupling may collectively support the body at a fixed distance away from the inner surface of the shell with the body substantially parallel to the inner surface of the shell.

In some implementations, the auxiliary component may be a ladder including a plurality of rungs, and a longitudinal axis defined by each rung of the plurality of rungs extends in a direction perpendicular to each of the first force and the normal component of the second force.

In certain implementations, the auxiliary component may include a cable defining a longitudinal axis substantially parallel to the first force exerted by the auxiliary component on the shell.

In some implementations, at least one of the first force and the normal component of the second force may be a tensile force exerted by the auxiliary component on the shell.

According to another aspect, a method of assembling a tower may include fastening a first coupling of an auxiliary component to a section of the tower, the section of the tower including a shell having an inner surface substantially parallel to a first force exerted by the auxiliary component fastened to the section of the tower, and attaching a second coupling of the auxiliary component to the inner surface of the shell without penetrating the inner surface of the shell, wherein the second coupling is attached to the inner surface of the shell in an orientation in which a normal component of a second force is exerted by the auxiliary component on the shell, via the second coupling, in a direction substantially perpendicular to the first force, and in which the second coupling is preferentially flexible in a direction perpendicular to the normal component of the second force.

In certain implementations, the section of the tower may include a flange coupled to the shell and fastening the first coupling of the auxiliary component to the section of the tower may include fastening the first coupling to the flange.

In some implementations, attaching the second coupling of the auxiliary component to the inner surface of the shell may include attaching the second coupling in an orientation in which the normal component of the second force is greater than a shear component of the second force exerted by the auxiliary component on the shell via the second coupling.

In certain implementations, attaching the second coupling of the auxiliary component to the inner surface of the shell may include placing an adhesive portion of the second coupling in contact with the inner surface of the shell.

Other aspects, features, and advantages will be apparent from the description and drawings, and from the claims.

BRIEF DESCRIPTION OF THE FIGURES

Like reference symbols in the various drawings indicate like elements.

DETAILED DESCRIPTION

Embodiments will now be described more fully hereinafter with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially" or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," and "below," and the like, are words of convenience and are not to be construed as limiting terms unless specifically stated.

Devices, systems, and methods of the present disclosure are described with respect to auxiliary components for wind towers. However, this is by way of example and should not be understood to limit the present disclosure in any way. Thus, for example, the devices, systems, and methods of the present disclosure may further, or instead, be used in association with any of a variety of useful structures benefitting from mounting auxiliary components with little to no impact on structural performance of the structure. Examples of such other useful structures include, without limitation, pilings, other structural pieces for civil engineers (e.g., columns), pipelines, spiral ducting, and the like.

Figure 1A:
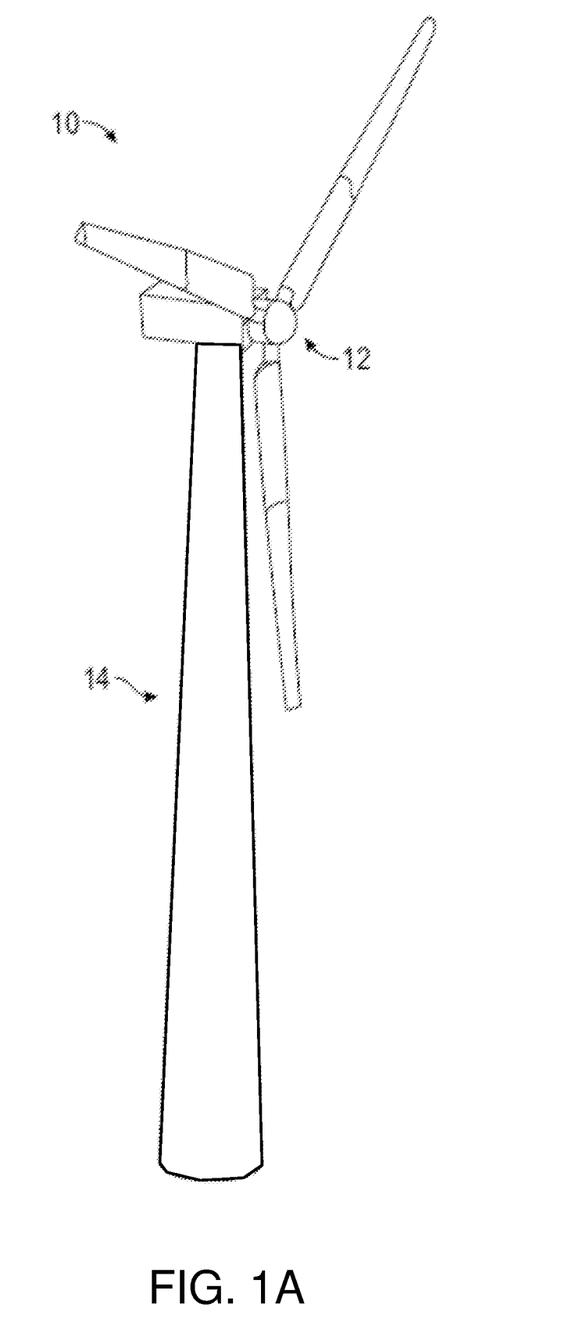
FIG. 1A is a schematic of a wind turbine assembly.
Figure 1B:
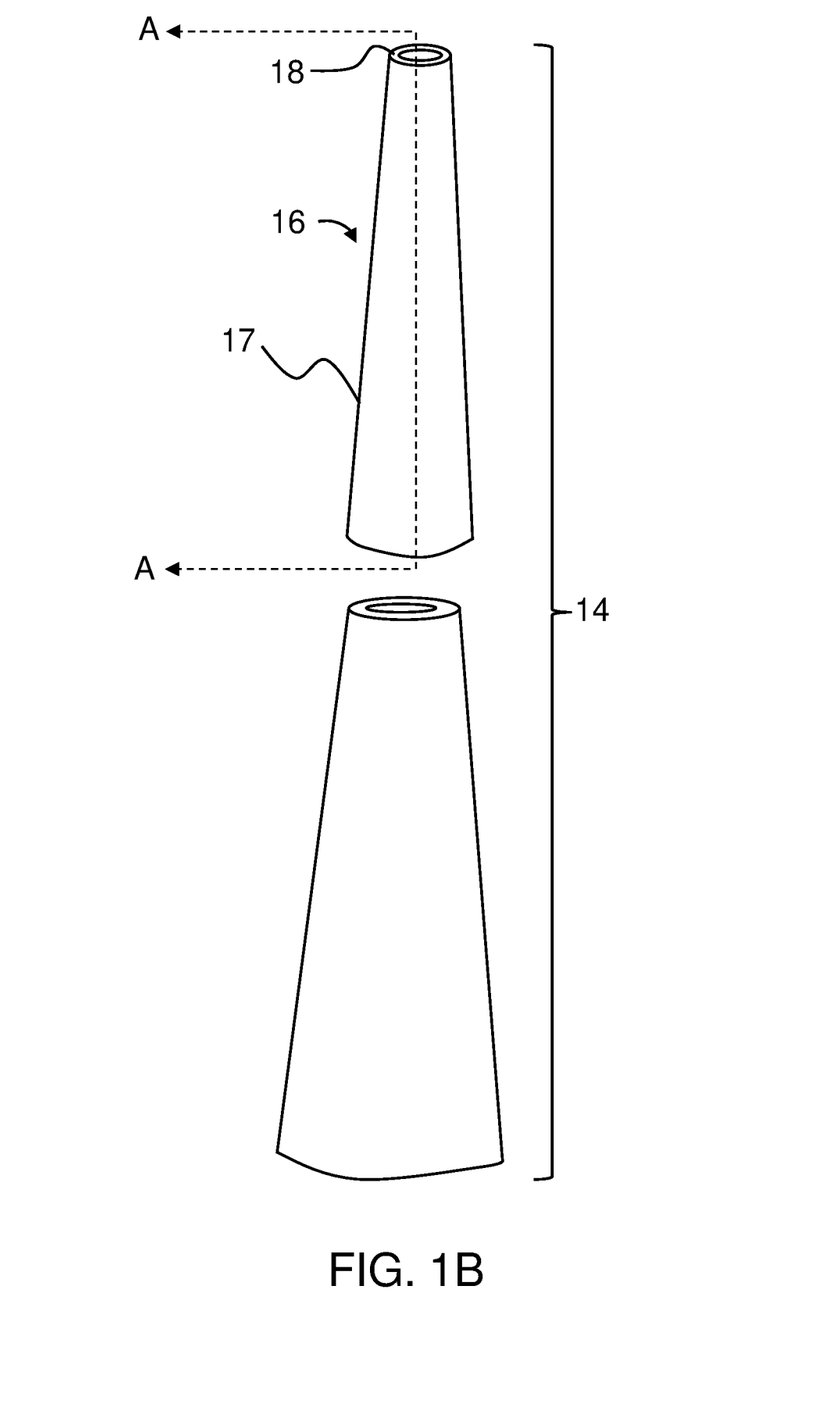
FIG. 1B is a perspective, exploded schematic representation of a tower of the wind turbine assembly of FIG. 1A.
Figure 2:
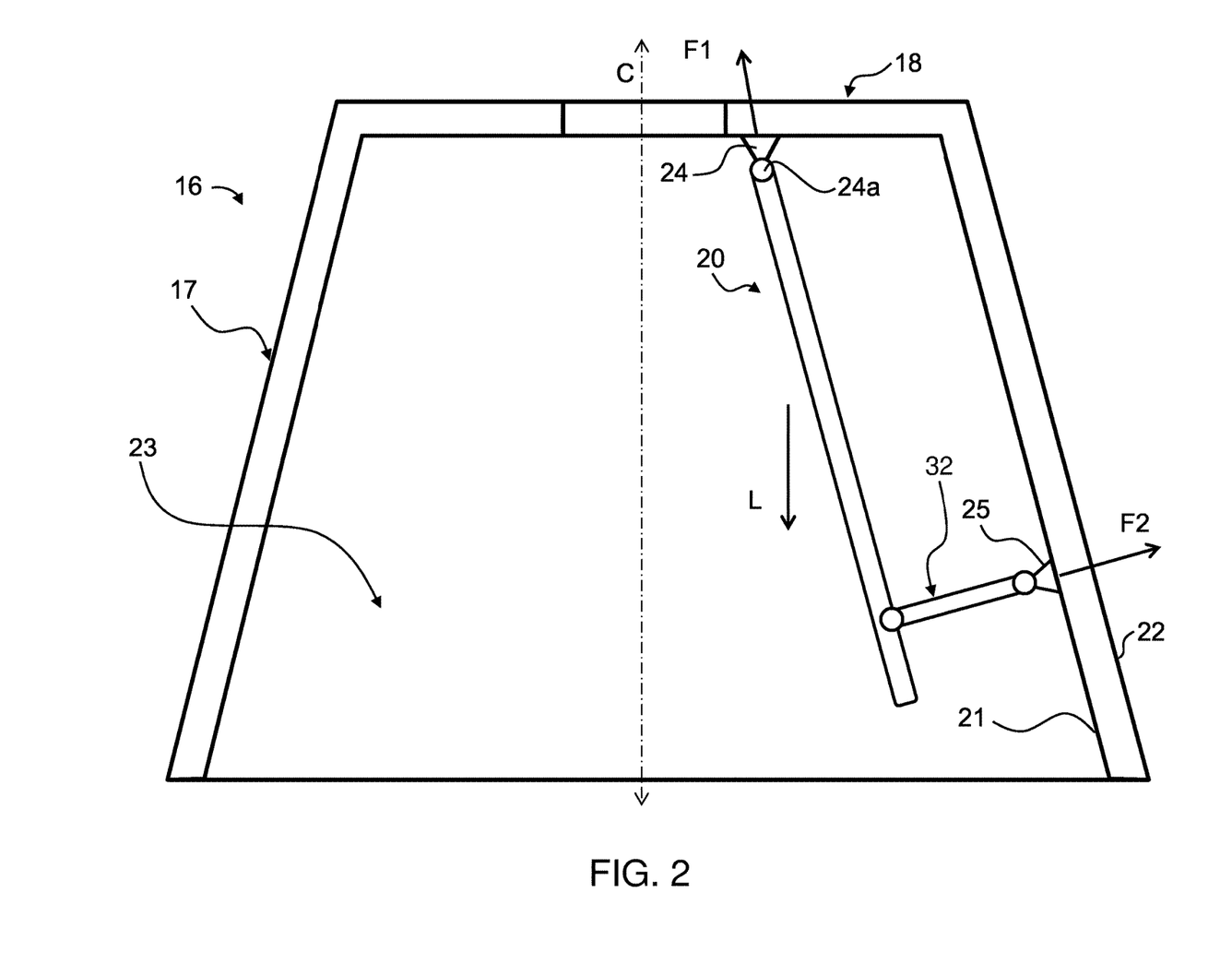
FIG. 2 is a cross-sectional schematic representation of a section of the tower of the wind turbine assembly taken along the line A-A in FIG. 1B and showing an auxiliary component coupled to the section of the tower.
Figure 3A:
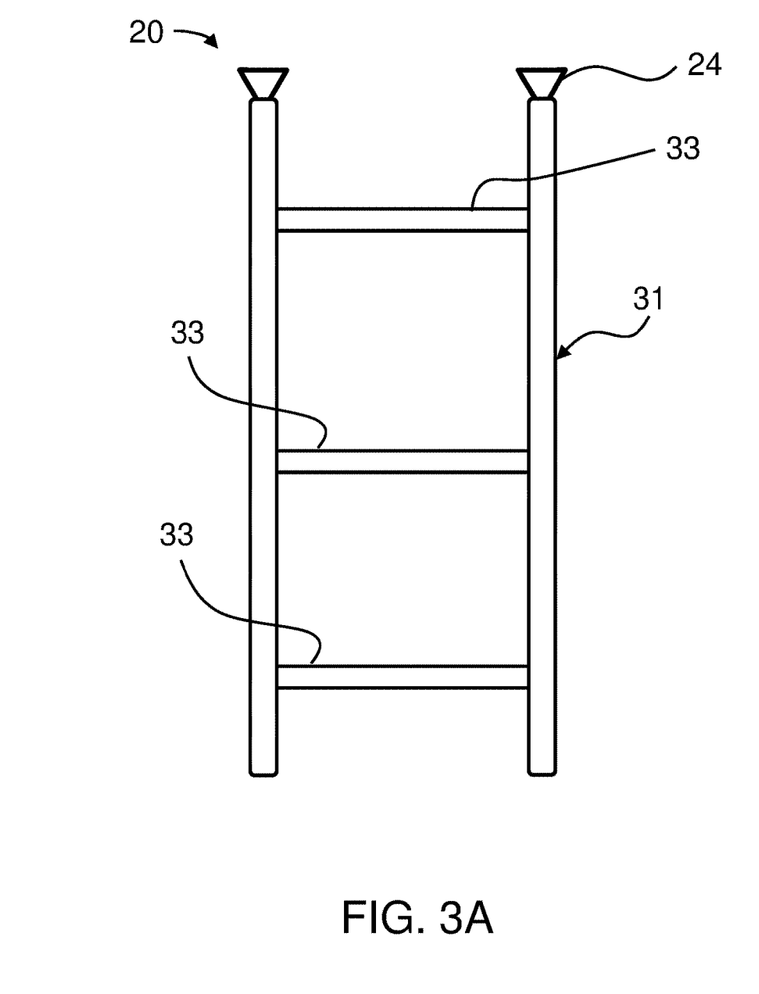
FIG. 3A is a schematic representation of a front view of the auxiliary component of FIG. 2 in an unmounted state.
Figure 3B:
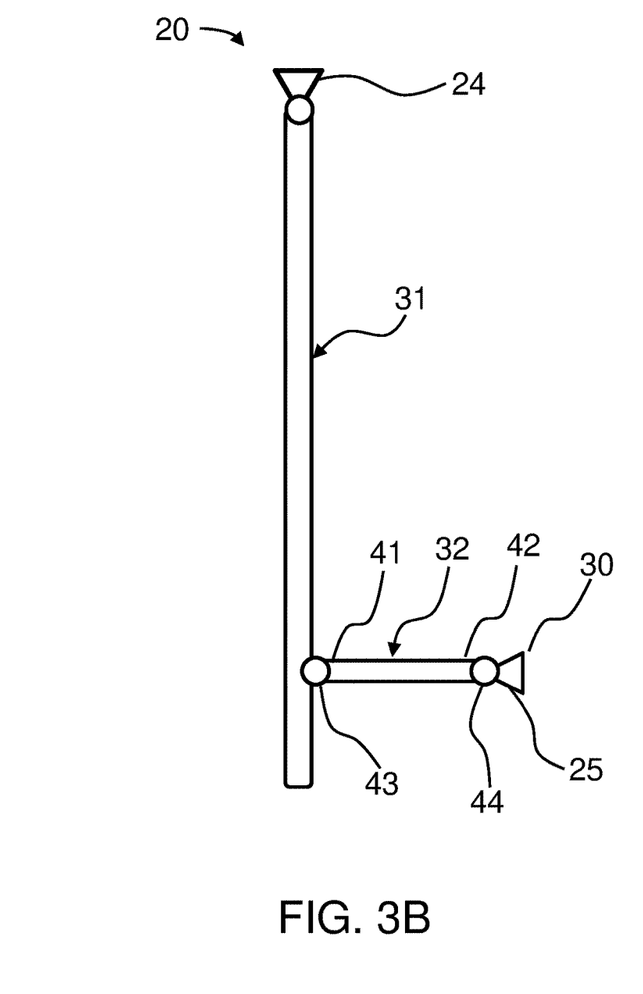
FIG. 3B is a schematic representation of a side view of the auxiliary component of FIG. 2 in an unmounted state.

Referring to FIGS. 1A, 1B, and 2, a wind turbine assembly 10 may include a wind turbine 12 supported by a tower 14. The tower 14 may include one or more sections, including a section 16, with the number of the one or more sections selected as necessary or desirable for a particular application. In the description that follows, the one or more sections of the tower 14 are described with respect to the section 16. However, unless otherwise specified or made clear from the context, it should be appreciated that any one or more of the sections of the tower 14 may include the features of the section 16.

The section 16 may include a shell 17 and a flange 18 coupled (e.g., welded) to the shell 17. The shell 17 may have a tubular shape, and the flange 18 may extend in a radial direction (e.g., radially inward) relative to the shell 17. The flange 18 may be attachable to one or more additional components such that the section 16 may be coupled to another section or to the wind turbine 12 (or other similarly supported machinery) via the flange 18 to form the tower 14 and, ultimately, to form the wind turbine assembly 10. In general, the tubular shape of the shell 17 of the section 16 is a conduit protected from weather and, thus, the one or more sections of the tower 14 may collectively form a continuous duct useful for maintenance and operation of the wind turbine assembly 10. For example, as described in greater detail below, the shell 17 may support one or more auxiliary components, such as an auxiliary component 20, useful as part of maintenance and/or operation of the wind turbine. As described in greater detail below, the auxiliary component 20 may be supported by the section 16 with a force distribution that reduces or eliminates the need to compromise the shell 17 structurally (e.g., through welding or other similar techniques) for the purpose of mounting the auxiliary component 20. Such a reduction or elimination of the need to compromise the shell 17, in turn, reduces or eliminates the need to use thicker material to counteract the structural compromise of the shell 17. Thus, as compared to mounting auxiliary components using welding or other similar techniques that may compromise the shell 17, mounting the auxiliary component 20 according to any one or more of the methods described herein may reduce material cost and weight of the tower 14.

Referring now to FIGS. 2, 3A, 3B, and 4, the shell 17 of the section 16 may have an inner surface 21 and an outer surface 22 substantially opposite the inner surface 21. In general, the shell 17 may be formed (e.g., spiral formed) from one or more planar sheets of a base material (e.g., steel) such that the inner surface 21 and the outer surface 22 are substantially parallel to one another along the shell 17. More specifically, in an installed state of the wind turbine assembly 10, the inner surface 21 may be protected from an environment outside of the tower 14, while the outer surface 22 may be exposed to the environment outside of the tower 14.

The inner surface 21 may define at least a portion of a volume 23. For example, the inner surface 21 may define a circumference of the volume 23. Continuing with this example, in certain implementations, the shell 17 may be a tube such that the volume 23 is at least partially open along a top portion and a bottom portion of the shell 17 in an installed state of the wind turbine assembly 10. Components and/or personnel may pass longitudinally through the shell 17 (e.g., to an adjacent shell or to the wind turbine 12 in FIG. 1A) by moving through the volume 23. In certain implementations, the shell 17 may be a tube substantially symmetric about a center axis "C" defined by the tube and, in an installed state, the center axis "C" of the shell 17 may be aligned with a center axis defined by one or more other shells of other sections of the tower 14 (FIG. 1A). Thus, for example, the shell 17 may be tapered along the center axis "C." Additionally, or alternatively, the shell 17 may be substantially cylindrical along the center axis "C."

The inner surface 21 may include a surface of the base material of the shell 17 and any one or more coatings applied as a thin layer to all or a portion of the surface of the base material of the shell 17 without structurally compromising the surface of the base material of the shell 17. The inner surface 21 may, therefore, include a coat of paint disposed along the base material of the shell 17 and exposed to the volume 23. Further, or instead, in instances in which the base material of the shell 17 is a metal, the inner surface 21 may include any one or more of various different corrosion resistant coatings known in the art. Still further, or instead, the inner surface 21 shall be understood to include any one or more seams (e.g., welding seams) or other similar discontinuities present along the shell 17 to form the shape of the shell 17.

The auxiliary component 20 may be at least partially disposed in the volume 23 defined by the inner surface 21. In general, it should be understood that such positioning of the auxiliary component 20 may be useful for protecting the auxiliary component 20 from environmental conditions experienced by the outer surface 22 of the shell 17 in an installed state of the wind turbine assembly 10 (FIG. 1A). Thus, in such a position, the auxiliary component 20 may be less likely to experience degradation caused by exposure to the environment. Further or instead, with the auxiliary component 20 at least partially disposed in the volume 23, the auxiliary component 20 may be useable and/or serviceable by personnel through a variety of environmental conditions experienced by the wind turbine assembly 10 (FIG. 1A) in the field.

The auxiliary component 20 may include a first coupling 24 and a second coupling 25. The first coupling 24 and the second coupling 25 may attach the auxiliary component 20 to the section 16 in an orientation providing a useful distribution of forces, such as the distribution of forces described in greater detail below. For example, the first coupling 24 may be attached to the section 16 away from the inner surface 21 of the shell 17 such as, for example, along the flange 18. Further or instead, the second coupling 25 may be attached to the section 16 along the inner surface of the shell 17. For clear and efficient description in the description that follows, the auxiliary component 20 is described as including the first coupling 24 and the second coupling 25. Unless otherwise specified or made clear from the context, however, it should be generally understood that the first coupling 24 may be implemented as a plurality of couplings that collectively support a load as described herein with respect to the first coupling 24, and the second coupling 25 may be implemented as a plurality of couplings that collectively support a load as described herein with respect to the second coupling 25.

The auxiliary component 20 is attached to the section 16 in a static orientation. That is, the first coupling 24 and the second coupling 25 collectively restrict movement of the auxiliary component 20 in three dimensions relative to the inner surface 21 of the shell 17. For example, through the attachment provided by the first coupling 24 and the second coupling 25 a person may climb or descend the auxiliary component 20 without experiencing substantial movement of the auxiliary component 20 and, similarly, without damaging other components near the auxiliary component 20 and/or without damaging the section 16 itself. That is, the first coupling 24 and the second coupling 25 may support the auxiliary component 20 in a static orientation as the auxiliary component 20 undergoes static loading and/or dynamic loading. Further, as described in greater detail below, the first coupling 24 and the second coupling 25 may maintain the static orientation of the auxiliary component 20 through varying load conditions while also maintaining a force distribution that reduces, or eliminates, the need to weld or otherwise compromise the shell 17 of the section 16.

In general, the auxiliary component 20 may be attached to the section 16 via the first coupling 24 and the second coupling 25 such that a load "L" associated with the auxiliary component 20 is supported by a first force "F1" exerted by the section 16 on the first coupling 24 and by a second force "F2" exerted by the shell 17 on the second coupling 25. Without a separate load on the auxiliary component 20 (such as the weight of a person), the load "L" should be understood to correspond to the weight of the auxiliary component 20. Further, as used herein, the term "force" should be understood to refer to a vector quantity having both a magnitude and a direction, unless another meaning is specified or made clear from the context. Thus, with the auxiliary component 20 supported in a static orientation, it should be understood that a vector sum of the load "L," the first force "F1," and the second force "F2" is zero.

In particular, the first coupling 24 and the second coupling 25 may be attached to the section 16 such that the first force "F1" and the second force "F2" have a particularly useful orientation relative to one another. That is, the first force "F1" exerted by the auxiliary component 20 on the section 16 via the first coupling 24 may be substantially perpendicular to a normal component of the second force "F2" exerted by the auxiliary component 20 on the inner surface 21 of the shell 17 via the second coupling 25. As used herein, the substantially perpendicular orientation of the force "F1" to the normal component of the second force "F2" should be understood to allow for certain small deviations from a geometrically perpendicular orientation. Such small deviations may arise, for example, from dimensional variations associated with in-field installation. Thus, in this context, substantially perpendicular should be understood to include variations from perpendicular of less than about ±10 degrees or, in some instances, less than about ±5 degrees.

In general, the normal component of the second force "F2" may be the primary force component of the second force "F2." It should be appreciated, however, that achieving such alignment of the second force "F2" relative to the inner surface 21 may be impractical, given variations that may occur during installation of equipment. Thus, in certain circumstances, the second force "F2" may have a shear component (e.g., a force component extending in a direction parallel to the inner surface 21). The shear component of the second force "F2," however, should be understood to have a magnitude less than a magnitude of the normal component of the second force "F2." For example, the shear component of the second force "F2" may have a magnitude that is much smaller than a magnitude of the normal component of the second force "F2" such that the shear component does not have a meaningful impact on the relative orientation of "F1" and "F2." As a more specific example, the shear component of the second force "F2" may have a magnitude smaller than a shear strength of any one or more of the adhesives described herein. Further or instead, the magnitude of the shear component of the second force "F2" may be about 10 percent or less than the magnitude of the normal component of the second force "F2." Thus, for the sake of illustration in FIG. 2, the second force "F2" is represented as the normal component to the inner surface 21 of the shell 17.

With the first force "F1" substantially perpendicular to the normal component of the second force "F2" and with the second force "F2" formed primarily of a normal force component, the first force "F1" may extend in a direction substantially parallel to the inner surface 21 along a longitudinal of the inner surface 21. In such an orientation, the first force "F1" may support a substantial portion of the load "L" that would otherwise contribute to the magnitude of the shear component of the second force "F2." Slight deviations in the parallel orientation of the first force "F1" from the inner surface 21, therefore, may result in an increase in the shear component of the second force "F2." The first force "F1" and/or the normal component of the second force "F2" may be in tension or compression depending on, among other things, the direction and magnitude of the load "L" (which may vary over time) and the relative orientation and magnitude of the first force "F1" and the second force "F2." Generally, however, at least one of the first force "F1" and the normal component of the second force "F2" may be a tensile force exerted by the auxiliary component 20 on the shell 17. Thus, fastening techniques used to position the first coupling 24 and the second coupling 25 may be selected according to, among other parameters, tensile strength.

The first force "F1" and the second force "F2" may facilitate holding the second coupling 25 in place relative to the inner surface 21 through the use of fastening techniques characterized primarily by high tensile strength. That is, the shear strength and/or peel strength of such fastening techniques used to hold the second coupling 25 in place is made less critical by the manner in which the load "L" is distributed across first force "F1" and the second force "F2." As described in greater detail below, the class of fastening techniques characterized by high tensile strength and low shear strength and/or peel strength includes several techniques that are particularly advantageous for holding the second coupling 25 in place without compromising the shell 17 and, thus, are particularly useful alternatives to welding the second coupling 25 in place relative to the inner surface 21. For example, as compared to the use of welding, the second coupling 25 may be held in place relative to the inner surface 21 through the use of fastening techniques that do not require the use of heat that may otherwise stress the base material of the shell 17. Further, or instead, as compared to the use of welding, the second coupling 25 may be held in place relative to the inner surface 21 through the use of fastening techniques that leave the inner surface 21 unpenetrated by the second coupling 25 (e.g., coatings of the inner surface 21 may remain intact), which may be useful for preserving the structural integrity of the base material of the shell 17.

Figure 4:
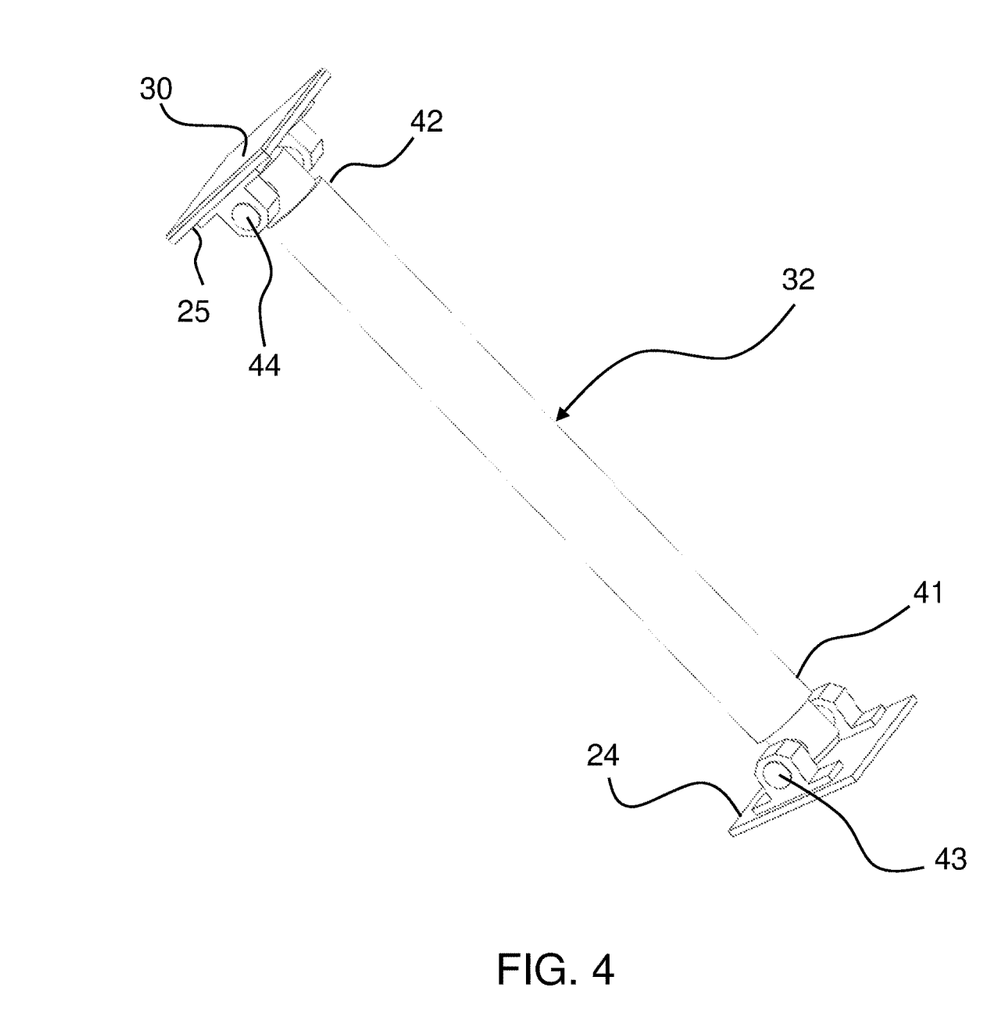
FIG. 4 is a perspective view of a second coupling of the auxiliary component of FIG. 2.

As an example, the second coupling 25 may include an adhesive 30 in contact with the inner surface 21 to hold the second coupling 25 in place relative to the inner surface 21. The adhesive 30 may include a single adhesive or a multi-component adhesive and, more generally, may include any one or more adhesives known in the art and having a tensile strength greater than the normal component of the second force "F2" and a shear strength greater than the shear component, if any, of the second force "F2." Further, or instead, the adhesive 30 may be in any one or more of various different forms. For example, the adhesive 30 may include a coating and/or a high bond tape. As an additional or alternative example, the adhesive 30 may include an adhesive tape (e.g., single-sided or double-sided) and may, optionally, include a carrier or backing material. As a more specific example, the adhesive tape may include a foam (e.g., an acrylic foam) as a carrier and an adhesive layer that bonds to the base material and/or to a coating of the inner surface 21.

The use of the adhesive 30 to hold the second coupling 25 in place relative to the inner surface 21 may have any one or more of several advantages compared to the use of welding to achieve the same placement. For example, the application of the second coupling 25 to the inner surface 21 through the use of the adhesive 30 may be achieved quickly, as compared to welding, thus reducing time required to assemble the section 16 and, ultimately, the tower 14 (FIG. 1A). Additionally, or alternatively, the adhesive 30 may be applied without the use of skilled labor and/or special tools required for welding, making the installation of the auxiliary component 20 less dependent on availability of personnel and/or equipment. This may be particularly advantageous with respect to logistics associated with remote installations of the wind turbine assembly 10. In certain instances, the adhesive 30 may have a low peel strength and, thus, may be removed in less time and/or less cost than may be required for the removal of a welded component.

As an additional or alternative example of a fastening technique characterized by a high tensile strength and a relatively low shear strength, the second coupling 25 may include a magnet (e.g., may be at least partially formed of a magnetic material, such as a permanent magnetic material). For example, the inner surface 21 of the shell 17, or the base material of the shell 17 adjacent to the inner surface 21, may be formed of a material (e.g., steel) containing one or more ferromagnetic components, and the second coupling 25 may include a magnet having a strength suitable to hold the second coupling 25 in a fixed position relative to the inner surface 21 of the shell 17. In general, it should be appreciated that the use of a magnet in this way may have several of the same advantages discussed above with respect to the use of an adhesive. Thus, as compared to welding, the use of a magnet to hold the second coupling 25 in place relative to the inner surface 21 is less likely to compromise the shell 17 and, further or instead, may have significant advantages with respect to any one or more of installation cost, time, and logistics.

In general, the load "L" exerted by the auxiliary component 20 on the section 16 may vary over the course of time. That is, the load "L" may be dynamic in response to any one or more of several conditions that may change in the field as the tower 14 (FIG. 1A) is in use. Such changes may include, but are not limited to, swaying of the tower 14 in response to wind conditions, force response of the tower 14 to movement of the wind turbine 12, and movement of personnel on the auxiliary component 20. To account for such potential dynamic variations of the load "L," the auxiliary component 20 may be mounted to the section 16 with a degree of flexibility useful for substantially maintaining the distribution of the first force "F1" and the second force "F2", as represented in FIG. 2 and described above, such that the auxiliary component 20 may remain in the static orientation in response to the dynamic variations in the load "L." Further, or instead, the auxiliary component 20 may be mounted to the section 16 with degree of flexibility useful for initially mounting to achieve a target distribution of forces.

In certain implementations, the auxiliary component 20 may be preferentially flexible in a direction perpendicular to the normal component of the second force "F2." In this way, shear force applied to the auxiliary component 20 at the second coupling 25 may be substantially transferred to the first coupling 24. Thus, for example, preferential flexing of the auxiliary component 20 may facilitate maintaining a shear component of the second force "F2" below a threshold value (e.g., a predetermined threshold value), such as may be suitable for the particular fastening technique (e.g., the adhesive 30) attaching the second coupling 25 and the inner surface 21. Accordingly, in certain instances, a degree of preferential flexibility of the auxiliary component 20 in the direction perpendicular to the normal component of the second force "F2" may be a function of the fastening technique used to attach the second coupling 25 to the inner surface 21 of the shell 17.

Preferential flexibility may be imparted to auxiliary component 20 through any one or more of various different techniques suitable for a particular application (e.g., based on size, shape, and function of the auxiliary component 20). In general, however, the auxiliary component 20 may include a body 31, and the first coupling 24 and the second coupling 25 may collectively support the body 31 at a substantially fixed distance (e.g., allowing for small vibrations) away from the inner surface 21 of the shell 17 (e.g., parallel to the inner surface 21 of the shell 17) as the auxiliary component 20 flexes in response to movement of the tower 14 (FIG. 1A) due to wind loading and/or in response to dynamic changes in the load "L." The body 31 may include the useful portion of the auxiliary component 20 (e.g., the portion of the auxiliary component 20 manipulated by personnel in the course of maintenance). As a specific example, the body 31 may be a ladder including one or more rungs 33, and a longitudinal axis defined by each rung 33 may extend in a direction perpendicular to each of the first force "F1" and the normal component of the second force "F2.". Supporting the body 31 away from the inner surface 21 of the shell may, for example, reduce the likelihood of unintended contact between the body 31 and the inner surface 21. For example, by supporting the body 31 away from the inner surface 21 of the shell 17, the first coupling 24 and the second coupling 25 may reduce the likelihood that the body 31 and the inner surface 21 may rub against one another—potentially damaging one another—as the dynamic load "L" varies.

In certain implementations, the auxiliary component 20 may include a linkage arm 32 useful for imparting preferential flexibility to the auxiliary component 20 in a direction perpendicular to the normal component of the second force "F2" while supporting the body 31 away from the inner surface 21 of the shell 17. That is, the linkage arm 32 may be substantially rigid in one or more directions relative to the second coupling 25 and may preferentially flex in one or more other directions relative to the second coupling 25 in response to dynamic variations in the load "L" such that the relative distribution of the first force "F1" and the second force "F2" may remain substantially unchanged. More specifically, through flexing of the linkage arm 32, the first force "F1" may remain substantially perpendicular to the normal component of the second force "F2" and, in certain instances, the shear component of the second force "F2" may remain small relative to the normal component of the second force "F2."

The linkage arm 32 may have a first end portion 41 and a second end portion 42 opposite the first end portion 41. The first end portion 41 may be mechanically coupled to the body 31, and the second end portion 42 may be mechanically coupled to the second coupling 25. As used in this context, mechanical coupling shall be understood to include any manner and form of mechanical connection that limits movement of the linkage arm 32 in at least one direction relative to one or both of the body 31 and the second coupling 25. Thus, for example, the linkage arm 32 may flex along the mechanical coupling between the first end portion 41 and the body 31 and/or along the mechanical coupling between the second end portion 42 and the second coupling 25.

As an example of flexing along the mechanical coupling of the linkage arm 32, the linkage arm 32 may be formed of a substantially rigid material (e.g., steel) and the first end portion 41 may include a first revolute joint 43 (e.g., also known as a pin joint or a hinge joint) and, further or instead, the second end portion 42 may include a second revolute joint 44. The first revolute joint 43 and the second revolute joint 44 may be, for example, any one or more of various different types of joints that rotate about an axis. Thus, for example, the first revolute joint 43 and the second revolute joint 44 may be any manner and form of pin joint or hinge joint, unless otherwise specified or made clear from the context. In use, the first end portion 41 of the linkage arm 32 may rotate about a pin of the first revolute joint 43 and, additionally or alternatively, the second end portion 42 may rotate about a pin of the second revolute joint 44. In particular, preferential flexing of the auxiliary component 20 in the direction perpendicular to the normal component of the second force "F2" may at least include rotation of the second end portion 42 of the linkage arm 32 about the pin of the second revolute joint 44. More typically, however, preferential flexing of the auxiliary component 20 in the direction perpendicular to the normal component of the second force "F2" may include rotation of the linkage arm 32 about the pin of the first revolute joint 43 and the second revolute joint 44.

Figure 5:
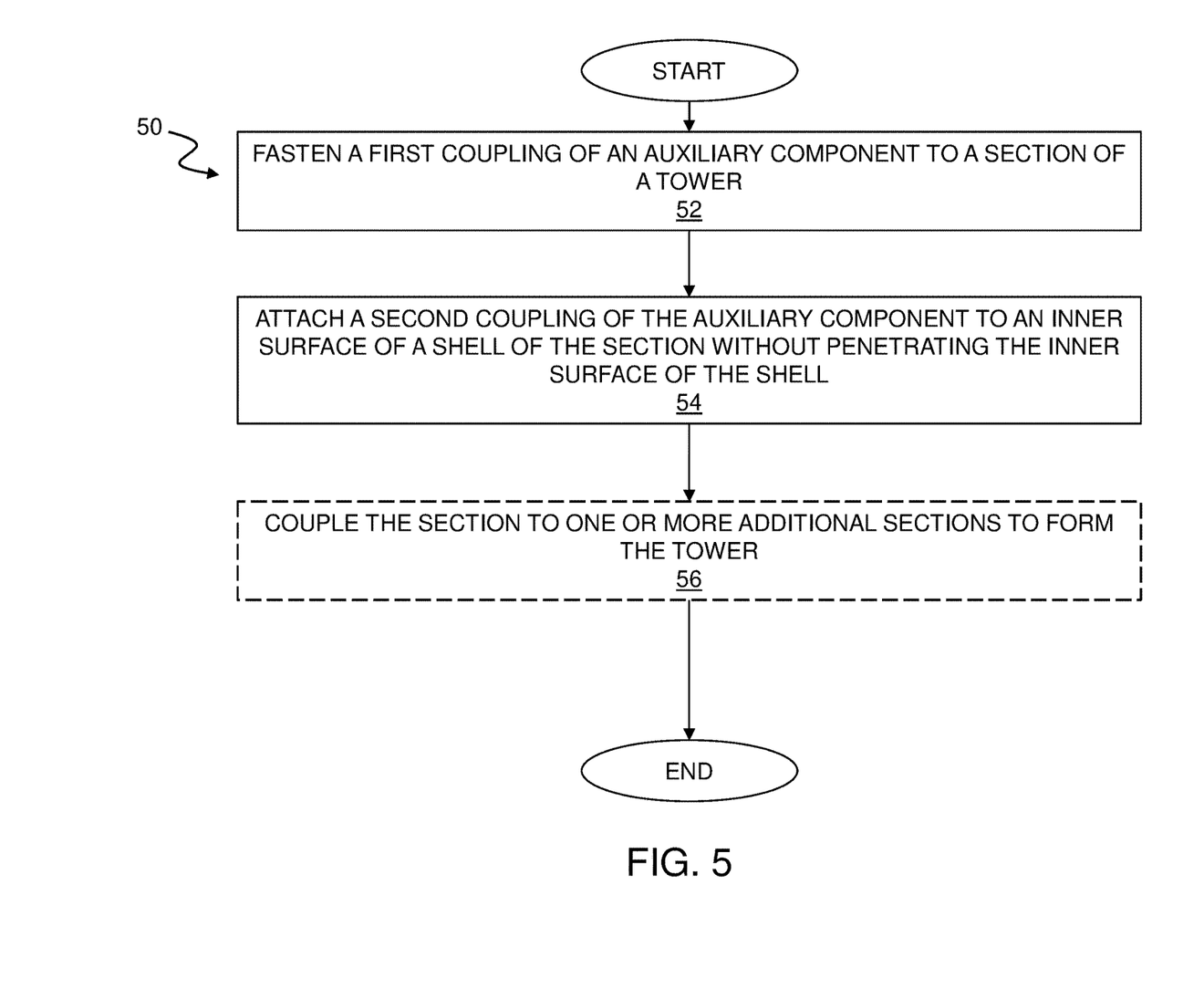
FIG. 5 is a flowchart of an exemplary method of assembling a tower.

Referring now to FIG. 5, a flowchart of an exemplary method 50 of forming a tower is shown. It should be appreciated that the exemplary method 50 can be carried out to form any one or more of the towers described herein. Thus, for example, one or more steps of the exemplary method 50 may be carried out to form the tower 14 (FIG. 1A) from one or more sections, such as the section 16 (FIGS. 1B and 2). In certain implementations, one or more steps of the exemplary method 50 may be carried out in the field (e.g., at the site of the installation), which may be particularly useful in instances in which it is impractical (e.g., due to considerations of weight and/or size) to transport one or more of the sections.

As shown in step 52, the exemplary method 50 may include fastening a first coupling of an auxiliary component to a section of a tower. The section of the tower may be any one or more of the sections described herein and, thus, may generally include a shell having an inner surface. In certain implementations, the first coupling of the auxiliary component may be fastened to the tower such that the inner surface of the shell is substantially parallel to a first force exerted by the auxiliary component fastened to the section of the tower.

The first coupling may be fastened along any one or more portions of the section. The section may include, for example, a flange and a shell, and the first coupling may be fastened to the flange, as described above.

Fastening the first coupling of the auxiliary component to the section of the tower may include any of various different known fastening techniques and, in particular, may include any one or more known fastening techniques useful for withstanding substantial tensile forces. As should be appreciated, the nature of the technique used to fasten the first coupling to the section of the tower may depend on the magnitude and direction of a force that will be exerted on the attachment between the first coupling and the section and, further or instead, may depend on the location of the attachment of the first coupling along the section.

In instances in which the first coupling of the auxiliary component is fastened to the flange, the flange may be penetrated with little to no impact on the structural integrity of the tower being formed. Accordingly, holes may be drilled into the flange, and fastening the first coupling of the auxiliary component to the section of the tower may include securing the first coupling of the auxiliary component to the flange using bolts or other similar, standard hardware. Advantageously, fastening the first coupling of the auxiliary component through the use of standard hardware may reduce the need for specialized tooling and/or specialized personnel, which may particularly advantageous with respect to remote installations.

In certain instances, fastening the first coupling to the section may include the use of one or more adhesives, one or more magnets, or other similar non-invasive techniques. It should be appreciated, however, that the suitability of such non-invasive fastening techniques for the first coupling may depend on the strength (e.g., tensile strength) of the particular fastening techniques as compared to the anticipated tensile force (including dynamic variations) to be exerted on the first coupling as the auxiliary component is in use.

As shown in step 54, the exemplary method 50 may include attaching a second coupling of the auxiliary component to the inner surface of the shell. As an example, the second coupling may be attached to the inner surface of the shell without penetrating the inner surface of the shell. As compared to welding or other similar techniques, attaching the second coupling to the inner surface of the shell does not compromise the shell in a way that requires the use of a greater material thickness to accommodate the degradation in structural performance associated with the compromise.

In certain implementations, the inner surface of the shell may include a coating, and attaching the second coupling of the auxiliary component to the inner surface of the shell may include consideration of the coating. For example, in instances in which the inner surface of the shell is coated, the second coupling of the auxiliary component may be attached to the inner surface of the shell without disrupting the integrity of the coating. Accordingly, as compared to welding, which often requires removing the coating to expose a base metal, the second coupling of the auxiliary component may be less likely to interfere with benefits (e.g., corrosion resistance) associated with a coating on the inner surface of the shell. Additionally, or alternatively, attaching the second coupling to the inner surface of the shell may include masking the section of the tower as a coating is applied to the section. Continuing with this example, the second coupling may be attached to the portion of the inner surface of the shell that remains uncoated as a result of the masking and, in particular, the second coupling may cover (e.g., entirely cover) the bare area and adjacent coated area such that the uncoated area is sealed and protected from the elements. Further, or instead, attaching the second coupling to the inner surface of the shell may include removing a portion of a coating to expose a bare area and positioning the second coupling to cover (e.g., entirely cover) the bare area and adjacent coated area such that the uncoated area is sealed and protected from the elements. Such selective removal of the coating may be particularly useful, for example, in instances in which attaching the second coupling requires a larger tensile strength and/or shear strength than the coating itself provides.

In certain implementations, the second coupling may be attached to the inner surface of the shell in a specific orientation producing a useful distribution of forces, such as any one or more of the force distributions described herein (e.g., as described above with respect to FIG. 2). In particular, the second coupling may be attached to the inner surface of the shell in an orientation in which a normal component of a second force is exerted by the auxiliary component on the shell, via the second coupling, in a direction substantially perpendicular to the first force, and in which the second coupling is preferentially flexible in a direction perpendicular to the normal component of the second force.

Additionally, or alternatively, attaching the second coupling of the auxiliary component to the inner surface of the shell may include attaching the second coupling in an orientation in which the normal component of the second force is greater than a shear component of the second force exerted by the auxiliary component on the shell via the second coupling. In certain instances, the relative magnitude of the normal component of the second force to the magnitude of the shear component of the second force may facilitate the use of certain fastening techniques to attach the second coupling to the inner surface of the shell. In particular, in instances in which the shear component of the second force is sufficiently small, the second coupling of the auxiliary component may be attached to the inner surface of the shell using any one or more non-invasive fastening techniques, particularly techniques characterized by high tensile strength and relatively low shear strength (e.g., adhesives and/or magnets). Thus, for example, the second coupling of the auxiliary component may be attached to the inner surface of the shell (e.g., by placing an adhesive portion of the second coupling in contact with the inner surface of the shell) to hold the second coupling in place without the use of welding or other similar techniques that may compromise the structural integrity of the shell.

As shown in step 56, the exemplary method 50 may, optionally, include coupling the section to one or more additional sections to form the tower. Coupling one or more sections to form the tower may be carried out according to any one or more methods known in the art. Thus, for example, a given section may be coupled to an adjacent section through the use of welding, bolts, or other similar hardware. In general, the first coupling may be fastened to the section and the second coupling may be attached to the section before or after the section is coupled to one or more additional section to form the tower.

While certain embodiments have been described, other embodiments are additionally or alternatively possible.

For example, referring again to FIG. 2, the first coupling 24 may be preferentially flexible in a direction perpendicular to the first force "F1" exerted by the section 16 on the auxiliary component 20, via the first coupling 24. As a specific example, the first coupling 24 can include a third revolute 24a, which may be substantially similar to one or more of the first revolute joint 43 and the second revolute joint 44. Further, or instead, axes of rotation of the first revolute joint 43, the second revolute joint 44, and the third revolute joint 24a may be parallel to one another, which may be useful for facilitating coordinated flexing of the first coupling 24 and the second coupling 25 to achieve a desired distribution of the first force "F1" and the second force "F2" in response to the load "L."

As another example, while the second coupling has been described as including a first revolute joint and a second revolute joint in certain implementations, it should be appreciated that additional or alternative joints are possible. For example, while the linkage arm has been described as rotatable about revolute joints, other types of flexing of the linkage arm are additionally or alternatively possible. For example, referring now to FIG. 6, a linkage arm 32' may include a first end portion 41' and a second end portion 42' opposite the first end portion 41'. For the sake of clear and efficient description, an element with a prime (') in FIG. 6 should be understood to be similar to a corresponding element designated with an unprimed element number in other figures of the present disclosure and, thus, are not described separately from counterpart unprimed elements, except to note differences or to describe features that are more easily understood with reference to FIG. 6. Thus, for example, the linkage arm 32' shall be understood to be similar to the linkage arm 32 (FIG. 4), except that the linkage arm 32' preferentially flexes based on the shape of a first end portion 41' and a second end portion 42' of the linkage arm 32'. Accordingly, unless otherwise noted or made clear from the context, it should be appreciated that the linkage arm 32' may be used interchangeably with the linkage arm 32 (FIG. 4) as part of the auxiliary component 20.

Figure 6:
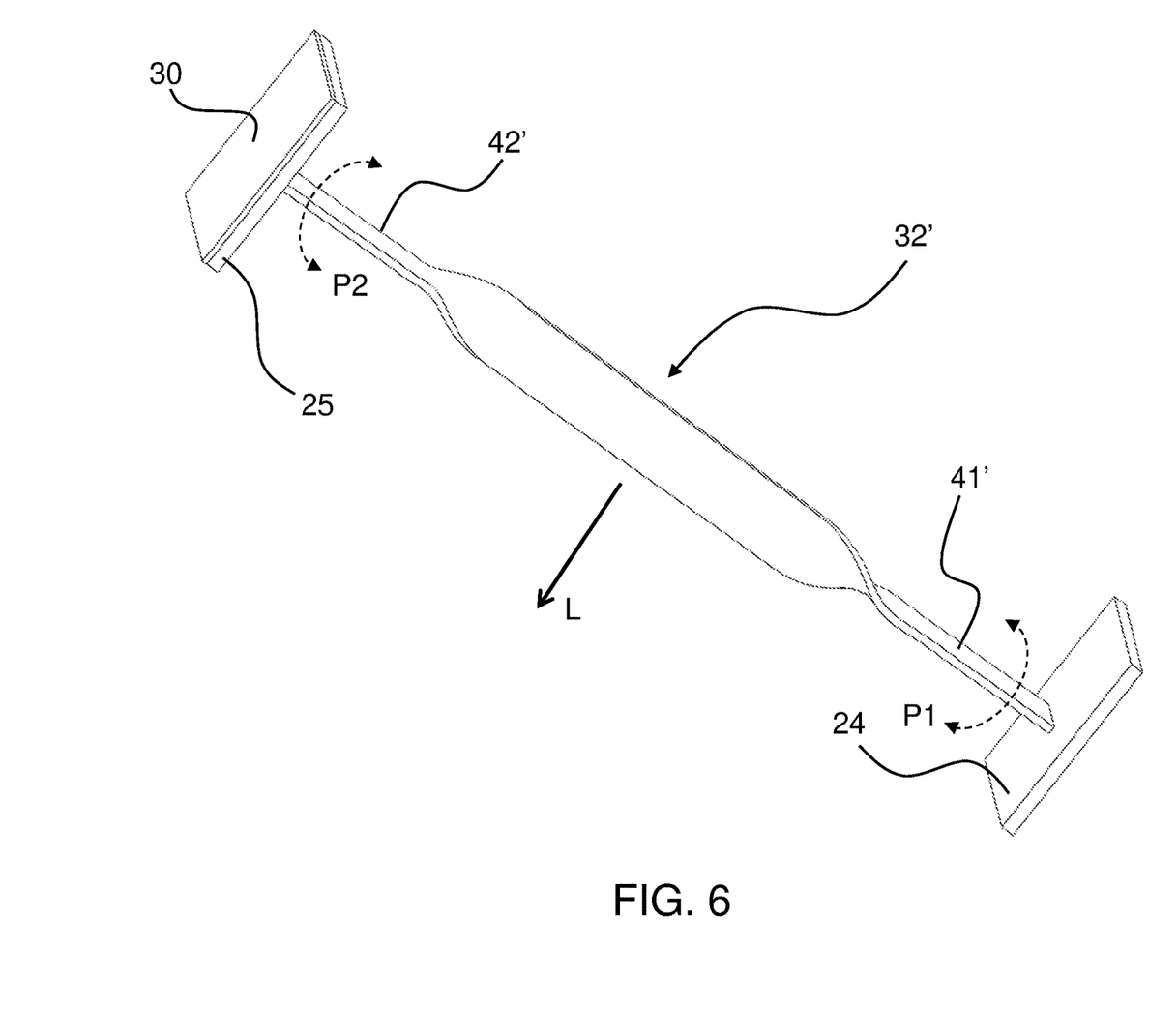
FIG. 6 is a perspective view of a second coupling of an auxiliary component, the second coupling including flexible sections.

The linkage arm 32' may be formed of a substantially rigid material (e.g., steel) and, in particular, may be formed as unitary body. As compared to the use of revolute joints, formation of the linkage arm 32' as a unitary body with preferential flexing may advantageously reduce cost associated with assembly the linkage arm 32'. Further or instead, as a unitary body, the linkage arm 32' may have fewer modes of potential failure as compared to a construction formed of a larger number of parts.

Preferential flexing of such a unitary construction may be achieved based on the shape of the first end portion 41' and the second end portion 42'. For example, each of the first end portion 41' and the second end portion 42' may have a thin dimension and a thick dimension along the length of the linkage arm 32'. In general, the linkage arm 32' may be preferentially flexible about an axis perpendicular to a longitudinal axis of the linkage arm 32' and in a plane defined by a wider face of the linkage arm 32' at any point along the length of the linkage arm 32'. Thus, to achieve a desired direction of preferential flexing at the first coupling 24 and the second coupling 25, the linkage arm 32' may be formed (e.g., twisted or otherwise distorted) to position the thick dimension of the first end portion 41' and the thick dimension of the second end portion 42' relative to a respective direction of preferred flexing relative to the respective one of the first coupling 24 and the second coupling 25. Thus, for example, the first end portion 41' of the linkage arm 32' may be preferentially flexible along a first direction P1, and the second end portion 42' of the linkage arm 32' may be preferentially flexible along a second direction P2. In general, the first direction P1 may be substantially equivalent to the movement of the first end portion 41 of the linkage arm 32 about the first revolute joint 43 (FIG. 4) and, similarly, the second direction P2 may be substantially equivalent to the movement of the second end portion 42 of the linkage arm 32 about the second revolute joint 44 (FIG. 4).

As still another example, while the auxiliary component has been described as including a ladder, it should be appreciated that other configurations are additionally or alternatively possible. That is, in general, the auxiliary component may be any one or more auxiliary components known in the art of and used for the maintenance and/or operation of wind turbine assemblies or other tower-mounted machinery. Thus, for example, the auxiliary component may include one or more cables, with the auxiliary component supporting the one or more cables along the length of the tower. As a more specific example, the cable may define a longitudinal axis, and the auxiliary component may support the cable with the longitudinal axis of the cable substantially parallel to the first force exerted by the auxiliary component, via the first coupling, on the shell.

As yet another example, while the auxiliary component has been described in the context of being positioned inside of the section of the tower, other positions of the auxiliary component are additionally or alternatively possible. For example, the auxiliary component may be externally supported on the shell.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A tower comprising:
   a section including a shell having an inner surface defining a volume; and
   an auxiliary component at least partially disposed in the volume, the auxiliary component including
   a first coupling secured to the section,
   a joint,
   a body flexibly secured to the first coupling via the joint,
   a linkage arm having a first end portion and a second end portion opposite the first end portion, the first end portion forming a joint with the body, the second end portion coupled to the inner surface of the shell and, in a direction substantially parallel to the weight of the auxiliary component, the first end portion forming the joint with the body thinner than a portion of the linkage arm between the first end portion and the second end portion, and the second end portion thinner than the portion of the linkage arm between the first end portion and the second end portion, and
   a second coupling secured to the inner surface of the shell with force at an interface between the second coupling and the inner surface of the shell having a normal component greater than a shear component, wherein the second end portion of the linkage arm is coupled to the inner surface of the shell via the second coupling.

2. The tower of claim 1, wherein the linkage arm is a unitary construction along the length of the linkage arm from the first end portion to the second end portion.

3. The tower of claim 2, wherein the linkage arm is twisted along the length of the linkage arm from the first end portion to the second end portion.

4. The tower of claim 1, wherein the first coupling and the linkage arm collectively restrict movement of the body of the auxiliary component in three dimensions relative to the inner surface of the shell.

5. The tower of claim 1, wherein the shell is a tube tapered along a center axis defined by the tube.

6. The tower of claim 1, wherein the first coupling is secured to the section at a fixed distance relative to the inner surface of the shell.

7. The tower of claim 1, wherein the body is a ladder including a plurality of rungs.

8. The tower of claim 1, wherein the second coupling is secured to the inner surface of the shell without penetration of the inner surface of the shell.

9. The tower of claim 1, wherein at least one portion of the inner surface of the shell is formed of a ferromagnetic material, and the second coupling includes a magnet in contact with the ferromagnetic material.

10. The tower of claim 1, wherein the second coupling includes an adhesive in contact with the inner surface of the shell.

* * * * *